Patented July 30, 1940

2,209,591

UNITED STATES PATENT OFFICE 2,209,591

WELL DRILLING FLUID

Charles Douglas Barnes, Long Beach, Calif., assignor to Union Oil Company of California, Los Angeles, Calif., a corporation of California No Drawing. Application January 20, 1936, Serial No. 59,904

19 Claims. (Cl. 255—1)

This invention relates to well drilling fluids, and particularly to fluids comprising solids in suspension in a liquid, for example muds ordinarily employed in connection with the drilling operations of oil and gas wells or other borings through earth strata.

The objects of this invention are to provide a drilling fluid of sufficient weight to insure proper control of the pressures of the penetrated formations within the well, having formation sealing properties which allow a minimum of loss of liquid to the penetrated formation, thin mud cake formation tendencies upon the walls of the penetration formation, freedom from the tendency of gas-cutting and the attendant danger of loss of control of the well, and having physical and chemical stability.

This invention resides in a modified well drilling fluid comprising a heavy suspension of solids in a liquid to which has been added an anti-gas-cutting agent. This invention also resides in a modified well drilling fluid comprising a heavy suspension of solids in a liquid to which has been added a formation sealing agent, and an anti-foaming agent or anti-gas-cutting agent. This invention more specifically resides in a drilling fluid comprising mud with admixture of a small percentage of a formation sealing agent, an anti-foaming agent, and a preservative.

In drilling wells for oil and gas by rotary tool methods it is common practice to circulate a drilling fluid known as the drilling mud down through the drill pipe and bit and return through the earth boring. The circulated drilling fluid serves to lubricate the drill pipe, cool the bit, carry the cuttings out of the hole to the surface, and to seal and hold the penetrated formation wall in place. It is also an important function of the drilling mud to prevent the escape of gas and other high pressure fluids from the penetrated formations into the bore hole. Since the prevention of the entrance into the bore hole of the high pressure fluids is prevented by the hydrostatic head of the mud fluid, it is desirable that this fluid should have a maximum density compatible with its other desirable characteristics and weighting materials such as barytes, hematite, and finely divided iron, may be employed for such increase in density.

The existence of an excess of hydrostatic head of the drilling fluid in the bore hole over that in the formation, however, results ordinarily in the penetration and loss to the formation of a quantity of the liquid portion of the drilling fluid and also results in the formation of a cake of the solids on the formation wall from which the liquids have thus been removed by penetration or infiltration into the formation. Many formations which have great structural strength when dry or undisturbed, lose their strength to a great degree when penetrated by the drill and saturated by the liquid from the drilling fluid. This penetration of the liquid portion of the drilling fluid into the exposed formation results in what has commonly been known as swelling, caving, loss of circulation and damage to productive sands.

It has been discovered that certain materials when added to the drilling fluid are effective in sealing and preventing or substantially inhibiting the penetration of the liquid from the drilling fluid into the porous formations. Some of the most effective of these formation sealing agents are, by way of illustration, corn strch, wheat flour, quebracho and psyllium seeds. In practice, it has been found necessary to add these substances to the drilling mud in quantities ranging from 0.05% to 3.0% by weight of the mixed mud in order to reduce the penetration of the formation by the drill mud liquid to a small fraction of that resulting when untreated muds are employed in drilling. The mud cake thickness formed in the formation wall is also at the same time greatly reduced.

Table I indicates the effectiveness of some of these materials in admixture in small percentage with a typical drilling mud in inhibiting fluid penetration into drilled formations.

Table I

| Drilling fluid | Weight of mud lb./cu. ft. | Funnel visc., seconds | Temp. of test, °F. | Pressure of test lb./sq. in. gage | Water forced from mud through core | | Thickness of mud cake, in. |
|---|---|---|---|---|---|---|---|
| | | | | | Total in 2 hours | Ml. per hr. last 30 min. | |
| Typical mud A | 73.7 | 32.2 | 200 | 2,000 | 49.8 | 18.5 | 0.27 |
| Typical mud A+0.7% white flour | 71.8 | 27 | 200 | 2,000 | 15.5 | 6.1 | Trace. |
| Typical mud A+2.06% white flour | 70.2 | 30 | 200 | 2,000 | 14.4 | 4.8 | Trace. |
| Typical mud A+2.04% corn starch | 69.6 | 30 | 200 | 2,000 | 11.5 | 4.2 | Trace. |
| Typical mud A+0.25% quebracho (a) crystals | 74.2 | 33 | 200 | 2,000 | 15.3 | 3.0 | Trace. |

Percentages are by weight.
White flour was cooked in water at boiling temperature for 25 minutes.
Corn starch was cooked in water at boiling temperature for 25 minutes.
(a) Tan bark extract.

A definition of funnel viscosity may be found in an A. P. I. paper by H. N. Marsh and Harvey Lytel, October, 1930.

The white flour and corn starch may be prepared for use in the drilling fluid by first cooking in water at boiling temperatures for approximately one half hour. The paste thus formed may be added to the drilling mud either prior to or during circulation thereof to the drill hole by any convenient means. The flour or starch may be added in dry form directly to the drilling mud, where the mud temperatures are moderately high, by means of a jet mixer similar to that employed for cement mixing in well cementing operations.

The psyllium seeds are preferably prepared by first grinding them to a powder and then boiling the powder to form a paste which is added to the drilling mud as in the case of cooked flour or starch. The psyllium seed flour may, however, be added directly to the drilling mud in dry form in the manner described hereinbefore for flour and starch.

The quebracho crystals are soluble in the mud and may be added thereto in any convenient manner although it may be convenient to previously prepare a concentrated solution of the quebracho and subsequently add the solution to the circulating mud stream.

The penetration tests were made under artificial conditions as nearly simulating actual subsurface well drilling conditions as possible and comprised circulating the mud mixtures at high pressures across the faces of formation test cores made from materials recovered from actual well coring operations. The test cores were so arranged that the high mud pressure differentials indicated in Table I could be maintained through them and so that the liquid penetrating the thickness of the formation could be recovered and accurately measured. The mud cake thicknesses were determined by removing the test cores from the testing apparatus and measuring them at the exposed edges. A more complete description of the above briefly described test method appears in the American Petroleum Institute paper "Evaluation of Rotary Drilling Muds" by P. H. Jones and E. C. Babson.

When the drill penetrates deep strata containing gas under high pressure gas tends to enter the bore hole and dissolve in or mix with the drilling fluid therein. As the fluid in its round of circulation moves upward from the drill and the gas containing formation toward the surface, the hydrostatic head of the fluid is progressively reduced, and this results in a release and expansion of the included gas. This release and expansion of gas in turn results in the permeation of the drilling fluid with gas bubbles which reduce its effective density and this reduction of density by gas permeation is known as "gas-cutting." It is necessary, therefore, that the drilling fluid which is employed under such conditions be freed of gas at the surface before it is again recirculated to the gas containing formation where additional gas cutting results. Even though the amount of gas cutting of the drilling fluid is only slight at each cycle of circulation, it is important that it be freed at each return to the surface, for otherwise it may accumulate to a degree where the gas-cutting is sufficient to reduce the overall density of the drilling fluid in the drill hole to such an extent that the hydrostatic head of the gas containing drilling fluid may be less than that of the gas in the formation. When this over-balance of formation pressure obtains, the result is often a "blow out" in which the drilling fluid is ejected from the drill hole by the gas pressure.

Ordinarily the gas is removed without special means by simply releasing the pressure on the mud at the surface of the drill hole and allowing the gas to extricate itself from the mud during a short period of relative quiescence or during the time it is passing through the ditches or sand separating apparatus. However, as the conditioned drilling fluids become more complex with resulting increase of viscosity, immobility and thixotropic properties, it becomes more difficult to effect a satisfactory separation of the gas. This is particularly true in the present case where formation penetration inhibiting agents are utilized in admixture with the drilling fluid. When the hereinbefore enumerated formation penetration inhibiting agents were utilized in admixture with drilling muds comprising solids in suspension in water and when they were exposed to conditions tending to cause gas-cutting, a marked tendency to form stable gas-cut mud and foam was observed.

When stable gas-cut mud and foam is formed as a result of the presence in the drilling fluid under gas-cutting conditions of the hereinabove described formation penetration inhibitors, no practical amount of quiescence, agitation or circulation thereof in the ditches at the surface as heretofore commonly employed for the separation of gas, will effect satisfactory separation of the gas and reduction of the foam. The employment of formation penetration inhibitors alone under gas-cutting conditions and other conditions conducive to gas-cutting and foaming in the drilling fluid is therefore impractical.

It is necessary, therefore, in order to make practical use of the conditioned mud having desirably low formation penetrating characteristics and containing formation penetration inhibitors, to combine therewith anti-gas-cutting agents, which are effective in counteracting the increased gas-cutting and stable foam-forming tendencies imparted to the drilling fluid by the presence of such formation penetration inhibitors.

It has been found that octyl alcohol, and other similar alcohols of the aliphatic series; and fenchyl alcohol and other alcohols of the terpene series having low solubilities in water and marked surface tension effects when added in percentages in the order of from 0.06 to 1.00 by weight are effective in minimizing gas-cutting and foaming in drilling fluids, particularly in the conditioned drilling muds of the type hereinbefore described. Octyl alcohol is soluble to the extent of 0.06% by weight in water at 20° C. and percentages of from .0005 to 0.06 by weight give good results in suppressing gas-cutting and foam formation, although greater percentages may prove advantageous under some conditions.

Other anti-gas-cutting agents which may be added in small quantities varying from 0.03 to 1.00% by weight of the drilling fluid and which have been found to be effective particularly in combination with chilling fluids containing formation penetrating inhibitors, or formation sealing agents are: glycerin and other polyhydric alcohols; the fatty acids, coconut oil fatty acid, capryllic acid and hydroxy and unsaturated derivatives of fatty acids such as castor oil acids; the esters, glycol oleate, butyl stearate and glycerol monoricinoleate; the alcohols of the terpenes, terpineol and pine oil, fenchyl alcohol and waxes such as montan wax in mineral seal oil. The anti-gas-cutting agents can be broadly classified as anti-foaming agents with the above subclassifications.

Table II indicates the beneficial effect of octyl alcohol as an anti-gas-cutting agent upon mud which has been gas-cut and subsequently uniformly treated by agitation and settling to remove the included gas.

Table II

| Gas-cut conditioned mud containing a formation penetration inhibitor | Results of tests on gas-cut mud | | | | Initial gravity lb./cu. ft. at 80° F. before gas-cutting | Boiling point of anti-gas-cutting agent, ° F. |
|---|---|---|---|---|---|---|
| | 1st period of agitation | | 2nd period of agitation | | | |
| | Gravity, lb./cu. ft. | Temp., ° F. | Gravity, lb./cu. ft. | Temp., ° F. | | |
| 1. Mud D+2.0% cooked starch | 40.0 | 130 | 40.0 | 78 | 75.0 | |
| 2. Same as (1)+0.03% octyl alcohol | 61.5 | 118 | 64.0 | 110 | 75.0 | 384 |

It is important that the anti-gas-cutting agents to be added in combination with the formation penetration inhibitors to the mud, have boiling points well above the maximum temperatures of the muds leaving the drill hole at the surface and circulating through the ditches, so that loss by evaporation shall be a minimum. The boiling point of octyl alcohol is well above 212° F. as shown in the above Table II.

When the hereinbefore described combination of organic formation penetration inhibitors and anti-gas-cutting agents are employed in the drilling fluids where temperatures are on the average favorable for biochemical changes it has been necessary to also employ in admixture therewith suitable germicides or preservatives. Such preservatives which have been effective in preserving the desirable characteristics of the conditioned mud are phenol, cresol, cresylic acid, benzoate of soda and zinc chloride in quantities approximating 0.1% by weight of the drilling fluid.

Other formation sealing agents which are effective in admixture with the mud or drilling fluid under certain conditions are listed together with the before-mentioned preferred formation sealing agents under their various physical and chemical classifications, as follows: the protein colloids, glue, casein, milk powder, blood albumin and gelatin; the carbohydrate colloids, gum arabic and gum copal; the gelatinous vegetable pastes or slimes, sea weed (algenic acid), agar agar, cottonseed meal, linseed cakes, wheat flour, corn starch, quebracho and psyllium seeds; the sugars, dextrose, molasses and corn syrup; the waxes, montan wax and the soaps such as saponified montan wax.

All of these formation sealing agents can be broadly classified as organic colloids with the hereinbefore enumerated subclassifications.

The mechanism responsible for the successful performance of the formation sealing agents such as the starchy and pasty materials and organic colloids in general may probably be due to the effects associated with the combination of hydrophilic colloids such as these with the hydrophilic type of colloids usually present in drilling muds.

This invention reduces the dangers of "blowouts" and loss of control of the drilling well by providing a drilling fluid of proper formation sealing properties while at the same time insuring sufficient freedom from gas-cutting and the maintenance of sufficient density and stability.

These anti-gas-cutting agents have been effective with various drilling fluids, either conditioned or unconditioned and having different compositions, but these drilling fluids generally comprise aqueous suspensions of solid matter such as clay, bentonite etc.

This invention may therefore be applied to any drilling fluid wether conditioned or not, to reduce or prevent gas-cutting and foaming.

I claim:

1. An improved well drilling fluid having low gas-cutting tendencies comprising a liquid suspension of heavy solids to which has been added a modicum of octyl alcohol.

2. An improved drilling fluid having low gas-cutting tendencies comprising a suspension of heavy solids in water to which has been added a quantity of octyl alcohol in the order of 0.06 per cent by weight of the said water.

3. An improved well drilling fluid having low formation penetration and low gas-cutting tendencies comprising a suspension of heavy solids in water, a gelatinous organic formation penetration inhibitor and a modicum of an alcohol of the group consisting of an aliphatic alcohol having a boiling point above 212° F. and fenchyl alcohol.

4. An improved well drilling fluid having low formation penetration and low gas-cutting tendencies comprising a suspension of heavy solids in water, an added formation penetration inhibitor and a quantity of octyl alcohol not greater than 0.06 percent by weight of the said water.

5. An improved drilling fluid having low formation penetration and low gas-cutting tendencies comprising a suspension of heavy solids in water, starch in sufficient quantity to impart formation sealing properties to the mixture and a modicum of an aliphatic alcohol.

6. An improved drilling fluid having low formation penetration and low gas-cutting tendencies comprising a suspension of heavy solids in water, flour in sufficient quantity to impart formation sealing properties to the mixture and a modicum of an aliphatic alcohol.

7. An improved drilling fluid as in claim 5 in which the aliphatic alcohol is octyl alcohol.

8. An improved well drilling fluid having low gas-cutting tendencies comprising a liquid suspension of heavy solids to which has been added a modicum of fenchyl alcohol.

9. An improved well drilling fluid having low formation penetration and low gas-cutting tendencies comprising a suspension of heavy solids in water, an added formation penetration inhibitor and a modicum of fenchyl alcohol.

10. An improved well drilling fluid having low formation penetration and low gas-cutting tendencies comprising a suspension of heavy solids in water, an added formation penetration inhibitor and a modicum of octyl alcohol.

11. An improved drilling fluid as in claim 5 in which the alcohol is fenchyl alcohol.

12. The method of preventing the foaming of drilling mud which comprises adding thereto octyl alcohol.

13. A non-foaming drilling mud comprising clay, water and octyl alcohol.

14. An improved well drilling fluid comprising a suspension of heavy solids in water to which has been added a modicum of octyl alcohol.

15. An improved well drilling fluid comprising a suspension of heavy solids in water to which has been added a modicum of fenchyl alcohol.

16. A well drilling fluid according to claim 14 in which the heavy solids comprise a clayey colloid.

17. A well drilling fluid according to claim 15 in which the heavy solids comprise a clayey colloid.

18. A well drilling fluid according to claim 9 in which the heavy solids comprise a clayey colloid.

19. A well drilling fluid according to claim 10 in which the heavy solids comprise a clayey colloid.

CHARLES DOUGLAS BARNES.